United States Patent
Finarov

(10) Patent No.: US 8,049,882 B2
(45) Date of Patent: Nov. 1, 2011

(54) SPECTROMETRIC OPTICAL METHOD AND SYSTEM PROVIDING REQUIRED SIGNAL-TO-NOISE OF MEASUREMENTS

(75) Inventor: Moshe Finarov, Rehovot (IL)

(73) Assignee: Nova Measuring Instruments Ltd., Rehovot (IL)

( * ) Notice: Subject to any disclaimer, the term of this patent is extended or adjusted under 35 U.S.C. 154(b) by 650 days.

(21) Appl. No.: 11/719,419

(22) PCT Filed: Nov. 16, 2005

(86) PCT No.: PCT/IL2005/001211
§ 371 (c)(1),
(2), (4) Date: Nov. 20, 2008

(87) PCT Pub. No.: WO2006/054292
PCT Pub. Date: May 26, 2006

(65) Prior Publication Data
US 2009/0135419 A1    May 28, 2009

(30) Foreign Application Priority Data
Nov. 16, 2004  (IL) .......................... 165237

(51) Int. Cl.
*G01J 3/28* (2006.01)
(52) U.S. Cl. .......................................................... 356/326
(58) Field of Classification Search ................. 356/326, 356/328
See application file for complete search history.

(56) References Cited

U.S. PATENT DOCUMENTS

| | | |
|---|---|---|
| 4,253,765 A | 3/1981 | Kato et al. |
| 4,330,209 A | 5/1982 | Hashimoto et al. |
| 4,674,880 A | 6/1987 | Seki |
| 5,879,294 A * | 3/1999 | Anderson et al. ............. 600/310 |

* cited by examiner

*Primary Examiner* — F. L. Evans
(74) *Attorney, Agent, or Firm* — Browdy and Neimark, PLLC

(57) ABSTRACT

A system and method for use in spectrometric measurements of an article using selecting an optimal integration time range of the light detection system during which the measurement is to be applied, the optimal integration time being that at which a required value of signal to noise ratio (SNR) of the measurements is obtainable.

14 Claims, 4 Drawing Sheets

SPECTROMETRIC OPTICAL METHOD AND SYSTEM PROVIDING REQUIRED SIGNAL-TO-NOISE OF MEASUREMENTS

FIELD OF THE INVENTION

This invention is generally in the field of optical measurements, and relates to an optical method and system for spectral measurements that can be used in a variety of industrial and scientific applications. The present invention is particularly useful in applications where broadband spectral measurements are required, from DUV to IR spectral ranges, such as required in semiconductor industry for the process characterization and control.

BACKGROUND OF THE INVENTION

Spectrometry (or spectrophotometry) is an optical method for measuring the spectral response of an article to incident light including a plurality of wavelengths. This response may be based on reflectance (the method known as "reflectometry"), polarization change (the method known as "polarimetry" or "ellipsometry"), grating diffraction efficiency (the method known as "scatterometry"), and others.

In the spectrometric methods, one of the most important elements is a light source for article illumination, which produces a light beam of desired geometry, intensity and spectral range; and a light detection system that transforms light returned from the illuminated article into an electrical signal to be further digitized and processed with appropriate electrical and computing means.

In the spectrometric methods, various optical components are used for implementing a chosen optical scheme. A proper optical design is selected being aimed at keeping the brightness of a light source, i.e., providing attenuation of the light intensity by optical components as little as possible, in order to reach maximum signal-to-noise ratio (SNR) of the output measured signal. This SNR depends mainly on the sensitivity and noise of a detector, brightness of a light source, attenuation of an optical scheme, and the article properties as well. The higher SNR, the more precise measurements may be achieved.

A light detector typically has a limited range of signal to be accurately measured. A low level of the measured signal is limited by its intrinsic noise and shot noise of illumination light, while a high level of the measured signal is limited by saturation, i.e., the level of signal above which the light detector is no more sensitive to incident light. A ratio between the saturation and noise levels is a "dynamic range" of the light detector.

A high dynamic range is typically needed to enable accurate measurements with a required SNR in a wide range of varying properties of the measured article. For example, if an article under measurements is a silicon wafer with a multiple layer coating, and reflectance of the wafer is measured, a reflectance coefficient of such an article may vary from single percents at a certain wavelength range to about 100% at another wavelength range. Therefore, the required dynamic range of a light detector is to be large enough in order to provide a desirably high SNR in the entire range of measured parameters of the article.

SUMMARY OF THE INVENTION

There is a need in the art to facilitate spectrometric measurements within a broadband illumination, from DUV to NIR, by providing a novel measurement system and method.

The main idea of the present invention is associated with the following: Spectral characteristic of an optical scheme are mainly defined by multiplication of the spectral brightness of a light source, spectral sensitivity of a light detector and optical attenuation within a chosen spectral range. If this spectral characteristic is not constant within the entire spectral range, its variation reduces the dynamic range for a given article that may be measured with a given optical scheme. This problem is especially significant when measurements are carried out in a wide (broadband) spectral range, e.g., from DUV to NIR, where different light sources are to be combined in order to cover the entire spectral range.

The present invention solves the above problem by providing a method of selecting optimal conditions for spectrometric measurements in order to enable a required SNR within a limited dynamic range of a measurement system. Such optimization may be reached by optimal defining an integration time (measurement time) of a light detector at which the required SNR can be achieved even if a dynamic range of the detector is not large enough.

The present invention also provides for using a light source system in the form of a combination of a Deuterium lamp (D2) and a Quartz-Tungsten-Halogen lamp (QTH) in order to ensure the best measurement conditions in the spectral range from 180 nm to 950 nm. Such a combination enables much better performance of the measurement system (e.g., SNR and stability), than the currently widely used Xe lamp or combination of Xe and Deuterium lamps.

The integration time of a detector (actual measurement time) is adjusted in accordance with the given system spectral characteristic and reflectance of an article under inspection/measurement. If the reflectance of the article is unknown prior to the actual measurement, the measurement process may be divided into two stages: At the first (preliminary) stage, an optical spectral measurement is performed with a very small integration time value, when a signal in only narrow spectral zone with sufficient SNR is measured (e.g., signal of the greatest peak of the system spectral characteristics). According to this measured first signal, the second (main) integration time is calculated, which ensures that all the spectrum will be measured within the allowed dynamic range: between the signal level equivalent to minimal allowed SNR and the signal level when the detector is in saturation. Measuring in the article with the second integration time is used for further signal analysis.

If the first measured signal (spectrum) is outside the dynamic range of the detector, i.e., the dynamic range is insufficient to cover the entire spectrum with the required SNR and without reaching saturation, the main measurement is carried out in the following three stages: At the first stage, an optical spectral measurement is performed with a very small integration time, when a signal in only narrow spectral zone with sufficient SNR is measured (e.g. signal of the greatest peak of the system spectral characteristics). Based in the measured signal, the second integration time is calculated enabling all the peaks to be near to but lower than the saturation level. The second measurement is carried out with this calculated second integration time. Based on the second measurement, the third integration time is calculated enabling the lowest parts of the spectrum (valleys) to be near to but above the minimal allowed SNR. The third measurement is carried out with this third integration time value. After the second and third measurements are completed, both measured spectra are analytically combined in order to ensure the required SNR in the entire spectrum. This combination is carried out utilizing such partial spectral ranges of both spectra where the measured signal is in the useful range, i.e., between min SNR and saturation levels. In these ranges, a ratio between the two spectra is calculated in order to ensure correct and smooth (seamless) spectra combination.

It should be noted that the above methods work properly if both light source and the detector have stable operation in time, at least during the time period required for the entire measurement process. Such a light source as Xe-lamp is practically not stable enough for this technique. However, such lamps like Deuterium and QTH are very stable during the time period of several seconds needed for the completion of a measurement cycle (two or three measurements), and can therefore be used for this technique.

Thus, according to one broad aspect of the invention there is provided a method for use in spectrometric measurements of an article using an optical system having an illumination system and a light detection system, the method comprising selecting an optimal integration time range of the light detection system during which the measurement is to be applied, said optimal integration time being that at which a required value of signal to noise ratio (SNR) of the measurements is obtainable.

According to another broad aspect of the invention, there is provided a spectrometric optical system, comprising an illumination system, and a light detection system, the illumination system comprising first and second illuminators operating with different wavelength ranges producing together light of a wavelength range of about 180-950 nm; and a control unit connectable to the illumination and detection systems to control the operation thereof, the control unit being configured to select an optimal integration time range of the light detection system during which an actual measurement is to be applied, said optimal integration time being that at which a required value of signal to noise ratio (SNR) of the measurements is obtainable.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 3A to 3C illustrate the principles of the present invention for selecting optimal integration for a measurement system to reach a required SNR at a limited dynamic range of a light detector and with a significant dynamic range of the light source brightness, wherein FIG. 3A shows a measured signal (spectrum) for a case of optimal integration time, FIG. 3B shows a measured signal corresponding to a non-optimal integration time, smaller than the optimal one; and FIG. 3C shows a measured signal corresponding to a non-optimal integration time greater than the optimal one.

DETAILED DESCRIPTION OF THE INVENTION

Figure 1:
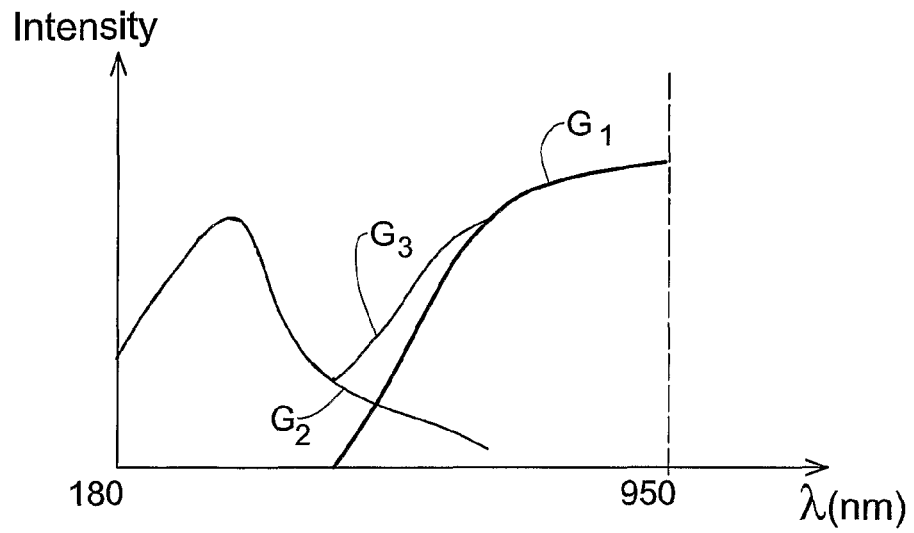
FIG. 1 illustrates the spectral characteristic of an optical system of the invention.

Referring to FIG. 1, the spectral characteristic (light intensity as a function of wavelength) of an optical system is illustrated. In this example, the optical system includes a Deuterium lamp (for example L-6999 commercially available from Hamamatsu, Japan), QTH lamp (for example HLX 64621 commercially available from Osram, Germany), and a pixel array detector, e.g., CCD type detector (e.g., a detection system including the S7031-1006 CCD of Hamamatsu, Japan). In the figure, graphs $G_1$, $G_2$ and $G_3$ correspond to the system operation with, respectively, QTH lamp illumination only, Deuterium lamp illumination only, and the illumination of both such lamps. It is clear that each of the lamps cannot cover the entire spectrum from 190 nm to 950 nm, while the combination of both, e.g. in 1:1 ratio, can provide sufficient SNR in the entire spectral range.

Figure 2A:
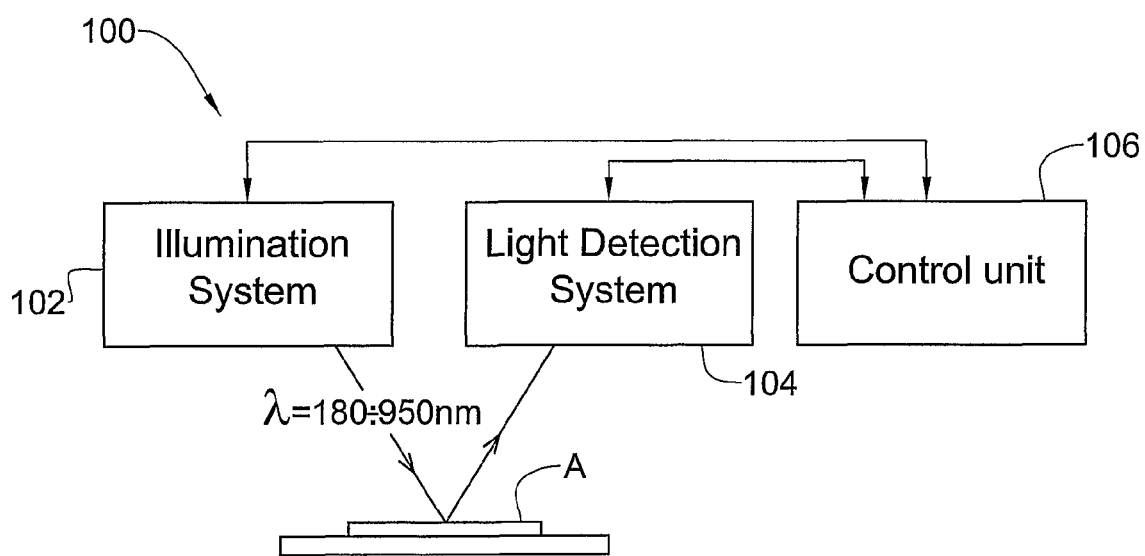
FIG. 2A is a block diagram of a spectrometric measurement system of the present invention.

Reference is made to FIG. 2A showing, by way of a block diagram, a spectrometric measurement system 100 of the present invention. The system 100 includes an illumination system 102; a light detection system 104; and a control unit 106 connectable (via wires or wireless) to the illumination and detection systems. The illumination system 102 is configured to produce light of a wavelength range of about 180-950 nm. The light detection system 104 has a certain dynamic range, which may be too limited. The control unit 106 is configured to operate the illumination and detection systems to apply at least one preliminary measurement to an article A and process measured data (at least one spectrum) to select an optimal integration time value or optimal integration time range of the light detection system during which an actual measurement is to be applied to this article. The optimal integration time value/range is that at which a required value of signal to noise ratio (SNR) of the measurement is obtainable.

It should be noted that the measurement system of the present invention may be appropriately configured for spectrophotometric measurements, reflectometry measurements, spectral reflectometry measurements, ellipsometry measurements, scatterometric measurements, or spectral scatterometry measurements. The principles of the measurement system configuration for carrying out these measurements are known per se and therefore need not be specifically described.

Figure 2B:
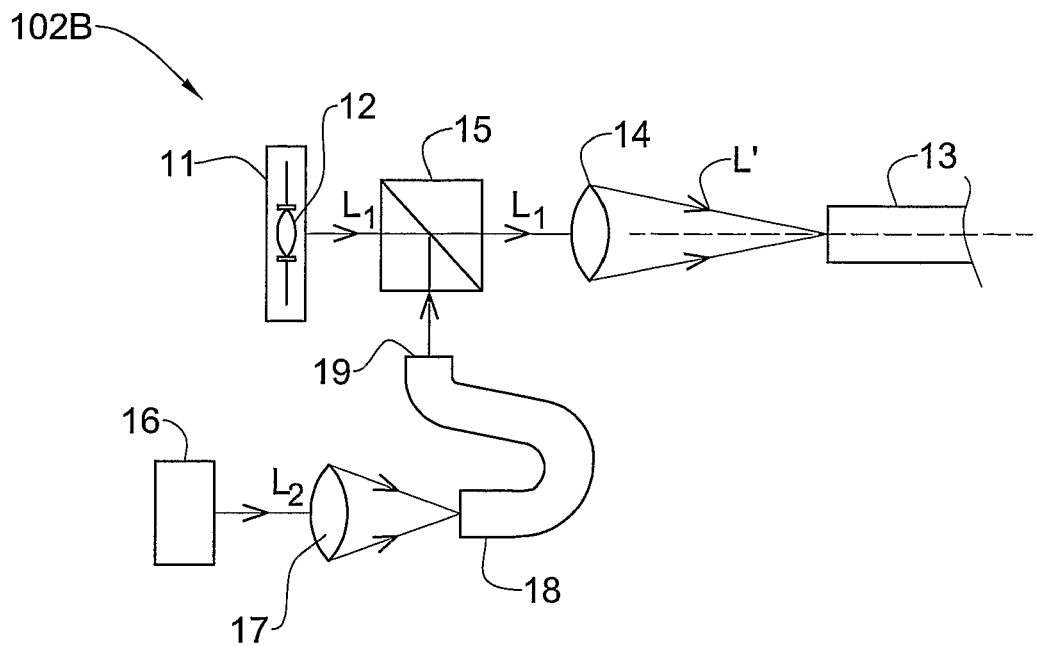
FIGS. 2B and 2C illustrate two examples, respectively, of an illumination system suitable to be used in the system of the present invention.
Figure 2C:
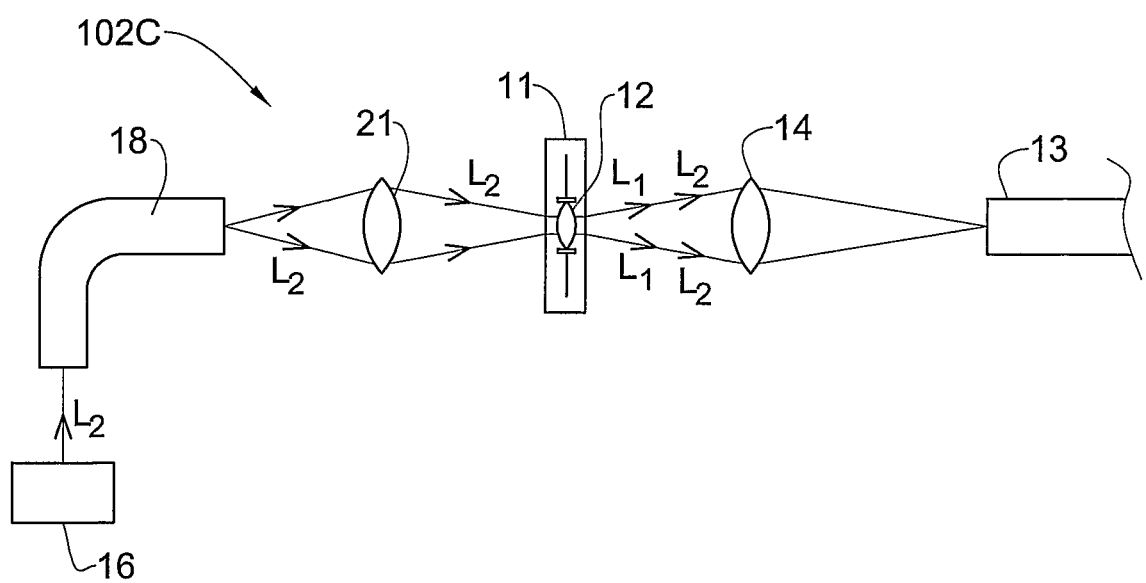

FIGS. 2B and 2C illustrate two examples, respectively, of an illumination system suitable to be used in the system 100.

In the example of FIG. 2B, the illumination system 102B includes a Deuterium lamp 11 (constituting a first illuminator) having a light emitting zone 12 (a gap between electrodes) that generates DUV light $L_1$, which is to be used in the illumination process. In the present example, DUV light $L_1$ propagates towards an input tip of a light guide 13, which in turn transfers this light towards a measurement location (not shown), e.g., via additional light directing assembly. This light $L_1$ passes through a condenser lens arrangement 14 (a single lens in the present example), which forms a light beam $L'_1$ that images the emitting zone 12 of the lamp 11 onto the light guide 13. The condenser lens arrangement 14 may be made of refractive optics, reflective optics or combination of both. Further provided in the illumination system 102B is a QTH lamp 16 (constituting a second illuminator) emitting light $L_2$. Light $L_2$ generated from the QTH filament is collected by a condenser lens 17, which transfers the light beam onto the input tip of a light guide 18. A beam-combiner 15 is appropriately accommodated between the lamp 11 and the condenser lens arrangement 14. The configuration is such that an output tip 19 of the light guide 18 is located on the same distance from the beam combiner 15 as the Deuterium lamp 11. Therefore, the beam combiner 15 combines light from the two lamps, Deuterium lamp 11 and QTH lamp 16 into one beam, while the output tip 19 of the guide 18 is imaged on the light guide 13 together with the emitting zone 12 of the Deuterium lamp 11.

In the example of FIG. 2C, an illumination system 102C is configured to implement another type of two beams combination of a so called "see-thru" type. To facilitate understanding, the same reference numbers are used to identify components that are common in both examples. The system 102C images the Deuterium lamp emitting zone 12 to the input tip of a light guide 13 by means of a condenser lens arrangement 14. Usually, the emitting zone 12 is a ring-like area between the electrodes. It is possible to "fill" this gap with an image of another lamp without affecting the Deuterium lamp itself. Such imaging may be carried out by an QTH assembly, namely, lamp 16, condenser lens arrangement 17, light guide 18 and a relay lens 21 that images the output tip 19 of the light guide 18 into the gap 12 of the Deuterium lamp 11.

Advantage of the setup of FIG. 2C relative to that of FIG. 2B is that there is no beam splitter 15, which attenuates both light beams. However, the setup of FIG. 2B requires more accurate alignment, especially in imaging the light guide tip 19 on a small area of the Deuterium gap 12.

It should be noted that while the presented setups 102B and 102C utilize an QTH lamp as a complementary light source for a Deuterium lamp, other lamps may be used as well, for example Xe lamp, Metal-Halide (MH) lamp, etc. Both the Xe and MH lamps, however, suffer from their instability, which usually requires additional reference channel for compensating on fluctuations and drifts; and from a high dynamic range needed for compensating on peak-to-value differences in their brightness characteristics. However, a significant advantage of Xe-lamp is that it provides relatively high brightness down to DUV spectral range, so it can be used alone or in combination with a Deuterium lamp for covering a very wide spectral range, from 190 nm to 950 nm.

The following is the explanation of methods of the present invention that allow reaching a needed SNR for measuring in different articles at a limited dynamic range of a light detector and with a significant dynamic range of the light source brightness.

Figure 3A:
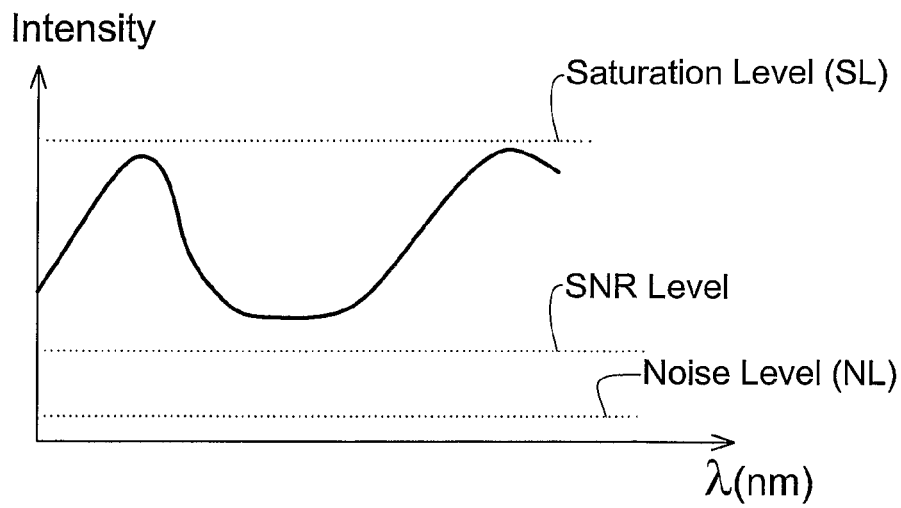

FIG. 3A shows a case of optimal selecting the integration time for a measurement system (detector), while at non-uniform spectral characteristics of the system. The integration time is chosen such that the highest signal value (peak) is close but below the saturation level of the detector, while the lowest signal value (valley) is corresponds to an SNR value near but above the required SNR level. This optimal integration time may be calculated for an article with known spectral reflectance for the system with pre-defined spectral characteristics. The figure shows a measured signal (spectrum) obtained with the so-selected optimal integration time.

Figure 3B:
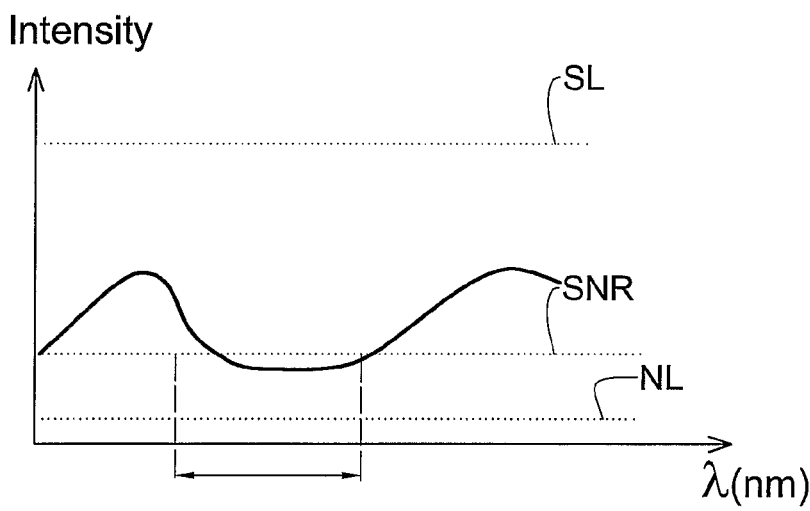

FIG. 3B shows a measured signal (spectrum) obtained with a non-optimal integration time, smaller than the optimal one, such that a part of the measured spectrum provides SNR under the required level and thus is less significant or even useless for further data analysis.

Figure 3C:
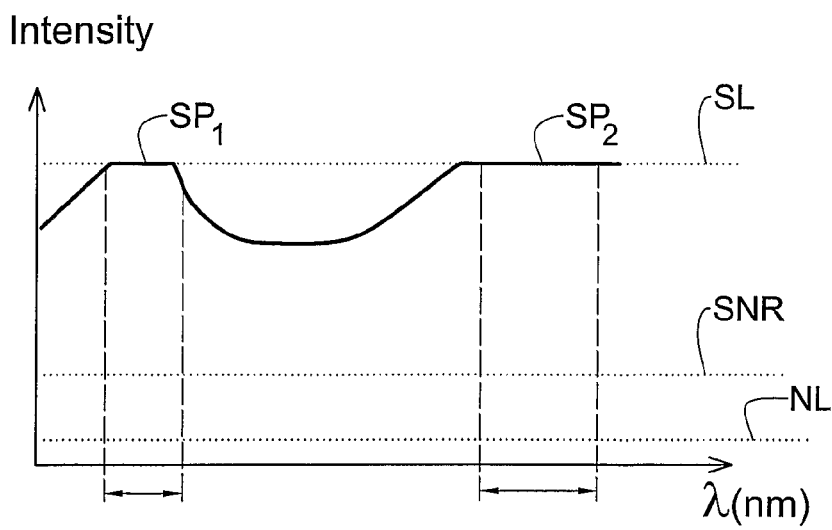

FIG. 3C shows a measured signal for a case when non-optimal integration time is chosen, greater than the optimal one, such that one or more parts (two parts $SP_1$ and $SP_2$ in the present example) of the measured spectrum are in saturation and thus is/are useless.

Figure 4:
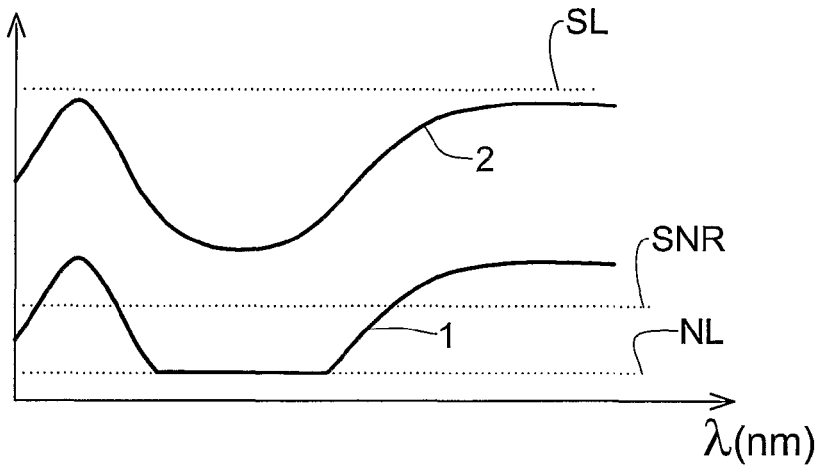
FIG. 4 and FIGS. 5A-5B exemplifies the measurement techniques of the invention for a case when the reflectance of an articles under measurements is unknown.
Figure 5A:
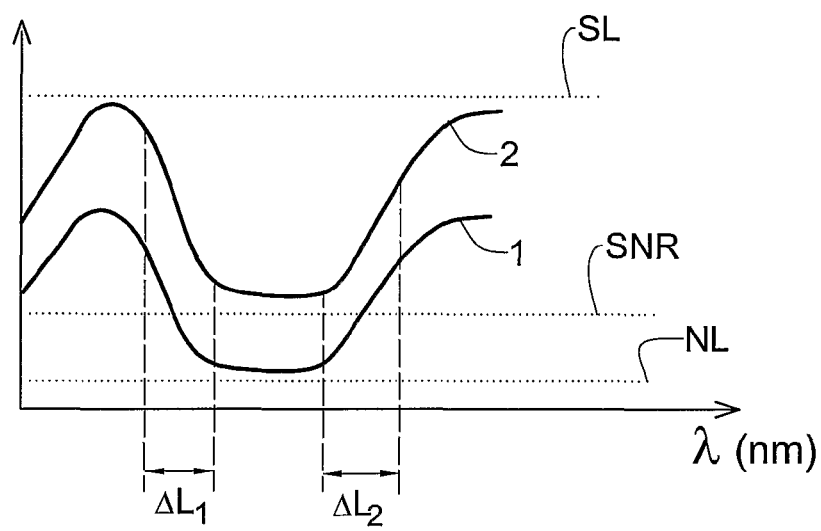
Figure 5B:
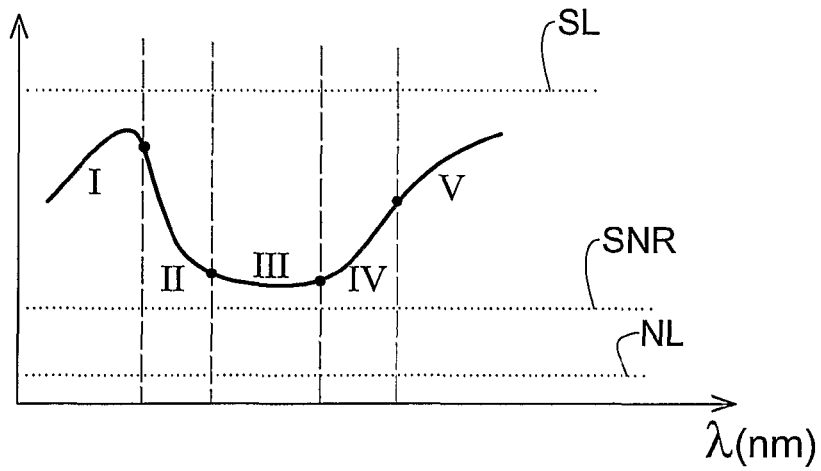

Reference is made to FIG. 4 and FIGS. 5A-5B, exemplifies the principles of measurement methods according to the invention enabling to reach the optimal measurement conditions, shown in FIG. 3A, when the articles reflectance is unknown.

In the example of FIG. 4, at the first stage (curve 1), the measurement is carried out with a small integration time value, so that at least one peak (e.g., the Deuterium lamp peak at the wavelength of about 240 nm) is higher than that corresponding to a predetermined minimal SNR level. In this case, most of the spectrum is under this level, even reaching the noise level. However, the measured value of this peak allows for determining the actual reflectance of the article and thus calculating the optimal integration time needed for actual measurements in this specific article. This optimal measured spectrum is shown as curve 2.

FIGS. 5A and 5B illustrate a more complex case when, because of a limited dynamic range of a light detector and very non-uniform spectral characteristics of a measurement system, there is no single-value optimal integration time enabling the entire spectrum to be in a range between minimal SNR and saturation signal levels. In this case, according to the present invention, two sequential measurements are performed: one measurement with the highest peak being below the saturation level (curve 1 in FIG. 5A) while part of the measured spectrum is under the minimal SNR level, and the other measurement (curve 2 in FIG. 5A) with the lowest valley being above the minimal SNR level while some other parts of this spectrum are in saturation. The integration time value used in both measurements is chosen so that both measurements include at least one spectral range (two spectral ranges $\Delta L_1$ and $\Delta L_2$ in the present example of FIG. 5A) in which both spectra are within the allowed signal range—between minimal SNR and saturation levels. These common useful spectral ranges allow accurate calculation of a ratio between two measured spectra in these spectral ranges that may be averaged and extrapolated to other spectral ranges. Using the calculated ratio, two spectra 1 and 2 may be then combined so that the combined spectrum will contain a measured signal measured under optimal conditions, i.e., between the minimal SNR and saturation level. Such a combined spectrum is shown in FIG. 5B, where zones I and V are taken from spectrum (curve) 1 of FIG. 5A, zone III is taken from spectrum (curve) 2 of FIG. 5A, zones II and IV are taken from both spectra and averaged.

Those skilled in the art will readily appreciate that various modifications and changes can be applied to the embodiments of the invention as hereinbefore exemplified without departing from its scope defined in and by the appended claims.

The invention claimed is:

1. A method for use in spectrometric measurements of an article using an optical system having an illumination system and a light detection system, the method comprising selecting an optimal integration time range of the light detection system during which the measurement is to be applied, said optimal integration time being that at which a required value of signal to noise ratio (SNR) of the measurements is obtainable, wherein the optimal integration time is determined using an a priori known value of a spectral reflectance of the article, and a pre-defined spectral characteristic of the measurement system, said optimal integration time being selected such that the highest value of a measured signal is slightly lower than a signal corresponding to a saturation level of the detection system, while the lowest value of the measured signal corresponds to a value of the SNR slightly above the required SNR value.

2. A method for use in spectrometric measurements of an article using an optical system having an illumination system and a light detection system, the method comprising selecting an optimal integration time range of the light detection system during which the measurement is to be applied, said optimal integration time being that at which a required value of signal to noise ratio (SNR) of the measurements is obtainable, wherein said selecting of the optimal integration time range comprises applying a preliminary spectral measurement with a relatively small integration time value such that at least one intensity value of the preliminary measured signal is higher than that corresponding to a predetermined minimal value of the SNR, thereby allowing to determine the reflectance of the article under measurements and calculate the optimal value for the integration time needed for the actual measurement in said article, said optimal integration time being selected such that the highest value of a measured signal is slightly lower than a signal corresponding to a saturation level of the detection system, while the lowest value of the measured signal corresponds to a value of the SNR slightly above the required SNR value.

3. A method for use in spectrometric measurements of an article using an optical system having an illumination system and a light detection system having a limited dynamic range, the measurement system having highly non-uniform spectral characteristics, the method comprising selecting an optimal integration time range of the light detection system during which the measurement is to be applied, said optimal integration time being that at which a required value of signal to noise ratio (SNR) of the measurements is obtainable, said optimal integration time being selected such that the highest value of a measured signal is slightly lower than a signal corresponding to a saturation level of the detection system, while the lowest value of the measured signal corresponds to a value of the SNR slightly above the required SNR value, wherein said selecting of the optimal integration time range comprises applying first and second sequential preliminary measurements to the article using a certain integration time, one of said first and second measurements being such that the highest value of the measured signal being below the saturation level while a part of the measured signal being under the minimal SNR level; and the other measurement being such that the lowest value of the corresponding measured signal being above the minimal SNR level while a part of said signal being in saturation.

4. The method of claim 3, wherein said certain integration time is selected so as to provide that the first and second measured signals include at least one common spectral range, in which both of the measured signals are within an allowed range of value of a measured signal defined by the require SNR, which is between the minimal SNR level and the saturation level.

5. The method of claim 4, wherein said certain integration time is selected so as to provide that the first and second measured signals include at least two common spectral ranges.

6. The method of claim 4, utilizing said at least one common spectral range to calculate a ratio between the first and second measured signals in said at least one common spectral range.

7. The method of claim 6, comprising averaging said at least one common spectral range and extrapolating it to other spectral ranges.

8. The method of claim 5, comprising utilizing the calculated ratio to combine the first and second measured spectral signals such that the entire combined spectrum contains a signal measured under optimal conditions, the signal being located between the minimal SNR and the saturation level.

9. A spectrometric optical system, comprising an illumination system, and a light detection system, the illumination system comprising first and second illuminators operating with different wavelength ranges producing together light of a wavelength range of about 180-950 nm; and a control unit connectable to the illumination and detection systems to control the operation of the illumination and detection systems, the control unit being configured to apply at least one preliminary measurement to an article and to select an optimal integration time range of the light detection system during which an actual measurement is to be applied to said article, said optimal integration time being that at which a required value of signal to noise ratio (SNR) of the measurements is obtainable.

10. The system of claim 9, comprising a beam combiner accommodated in optical paths of first and second light portions produced by, respectively, the first and second illuminators, to thereby combine these light portions into said light of the 180-950 nm wavelength range.

11. The system of claim 9, configured to allow passage of a second light portion, produced by the second illuminator, through the first illuminator, to thereby combine a first light portion, produced by the first illuminator, and the second light portion in a common optical path.

12. The system of any one of claim 9, wherein the first illuminator includes a Deuterium lamp, and the second illuminator includes a QTH lamp.

13. The system of claim 9, wherein the first illuminator includes a Deuterium lamp, and the second illuminator includes a Xe lamp.

14. The system of claim 9, wherein the first illuminator includes a Deuterium lamp, and the second illuminator includes a Metal-Halide lamp.

\* \* \* \* \*